No. 750,155. PATENTED JAN. 19, 1904.
O. E. BOGGS.
APPARATUS FOR SUPPLYING VARIOUS ATMOSPHERES.
APPLICATION FILED JAN. 8, 1903.
NO MODEL.
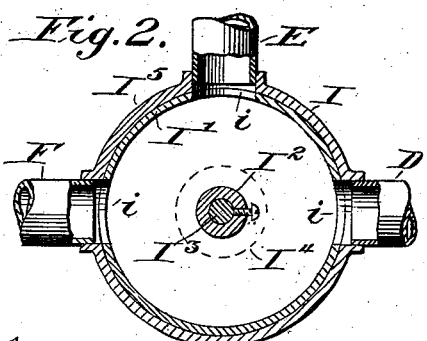
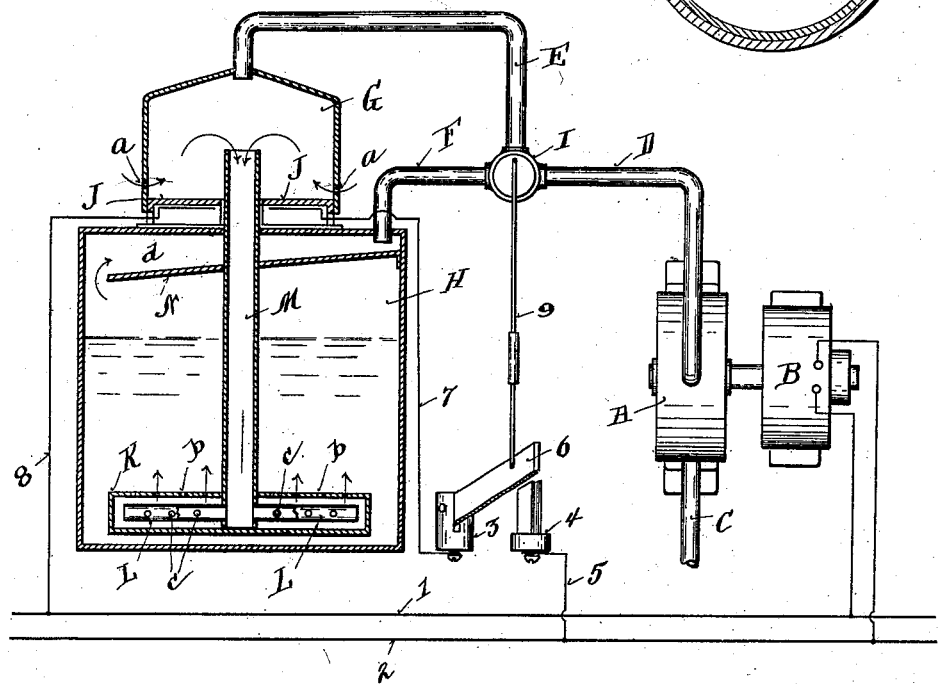

No. 750,155. Patented January 19, 1904.

UNITED STATES PATENT OFFICE.

ODIN E. BOGGS, OF CINCINNATI, OHIO, ASSIGNOR TO AUTOMATIC HUMIDITOR COMPANY, OF CINCINNATI, OHIO, A CORPORATION.

APPARATUS FOR SUPPLYING VARIOUS ATMOSPHERES.

SPECIFICATION forming part of Letters Patent No. 750,155, dated January 19, 1904.

Application filed January 8, 1903. Serial No. 138,193. (No model.)

*To all whom it may concern:*

Be it known that I, ODIN E. BOGGS, a citizen of the United States, residing at Cincinnati, in the county of Hamilton and State of Ohio, have invented certain new and useful Improvements in Apparatus for Supplying Various Atmospheres, of which the following is a specification.

My invention relates to an apparatus for producing atmospheres of varying degrees of humidity for distribution into compartments, rooms, cases, &c., whether for ventilating human habitations or the treatment of industrial commodities.

Preferably my said invention is used in connection with a separate invention of an apparatus for automatically controlling the degree of humidity which said invention is made to supply by compression, application papers of which are filed of even date herewith.

The various features of my invention are set forth in the description of the accompanying drawings, forming a part of this specification, in which—

Figure 1 represents a sectional diagrammatic view of my improved apparatus. Fig. 2 is an enlarged section of the valve shown in Fig. 1.

A represents an air compressor or pump, shown as operated by the electric motor B.

C is a conduit leading from the pump A for distribution to any room or compartment.

D is an air-conduit for supplying the pump. This conduit D has branch conduits E F, respectively, communicating with and forming an air-exit from the separate compartments G H, respectively.

I represents a three-way valve at the junction of the pipes D E F, controlling the atmospheres supplied to the pump. (See Fig. 2.) This valve may be any suitable three-way valve by means of which communication may be established to the air-pump either directly through the air-tank alone or indirectly through the air-tank and the humidifying-tank. As particularly shown in Fig. 2, the valve covers the inside casing I', the periphery of which fits the exterior casing I$^5$. This casing I' has a hub I$^2$, secured to the shaft I$^3$, which in turn is secured to a handle or knurl for turning the valve and indicated by the dotted lines I$^4$. The casing I' has the three valveways *i* for the three conduits F D B.

H represents the main tank or compartment supplied with water. Upon the top of this tank, but separate therefrom, is seated the heating-tank G, under which is the electric heater J.

*a* represents orifices on the sides and at the bottom of tank G for supplying air to the two tanks G H.

In order to render the air humid which is distributed by the pump A, the tank H is partially filled with water and the supplying-air is caused to pass through the same. The preferred form of accomplishing this is as follows: K represents a subcompartment located in the bottom of tank H, supplied with the outlet air-orifices *b*. Within this subcompartment K is a series of air-tubes L, extending outward radially from the base of a vertical air-tube M, which extends up through the tank H and terminates substantially near the top of the tank G. The radial pipes L are supplied with perforations *c*. N represents a baffle plate or shelf across the top of the compartment H and eccentric to the inner circumference of compartment H, leaving a passage *d* at one end between the end of the plate and the side of the compartment. This is to distribute the suction of pipe F and to prevent its drawing water with the air.

The electric heater is actuated as follows: 1 and 2 represent supply-wires. 3 and 4 represent contact-posts. 5 represents a wire connecting wire 2 with electrode 4. 6 represents a switch-bar which makes and breaks contact with the electrode 4. 7 represents a wire connecting electrode 3 with the heater J, and 8 represents a return-wire connecting the heater with the supply-wire. The switch-bar 6 is pivoted to the electrode 3, and the free end of this switch-lever 6 is connected by means of an insulated rod 9 with the cock of the three-way valve.

Mode of operation: By this arrangement three different atmospheres are supplied to the pump. First, a moist cold atmosphere; second, a moist warm atmosphere; third, a dry hot atmosphere. This last atmosphere is the converse of the other atmospheres—that is, it is a drying atmosphere from which the absolute humidity has been expelled and which consequently has the function of absorbing humidity from the atmosphere in the compartment to which it may be supplied.

First. In supplying moist cold atmosphere the cock of the three-way valve is open in communicating pipes F and D and shutting-off pipe E. The pump is started, the air is drawn in through the orifices $a$ of the tank G, passing downwardly through vertical tube M, outward through the radial pipes L, through the perforations $c$, into the compartment K, through the perforations $b$, upwardly through the water into the tank H, and outward through passage $d$, around the baffle-plate, and into pipe F.

Fig. 1 represents the apparatus to produce the operation above described. Should it be desired to furnish warm moist air, the cock of the three-way valve is slightly turned from the position shown in the figure to a second position, which throws the switch-bar 6 into contact with the electrode 4, thereby energizing the electrical heater J. The air in coming into the tank G is then heated and passes down through the system, the same as in the previously-described operation. This hot air is capable of absorbing a greater degree of humidity than the cold air used in the first operation.

Third. When it is desired to furnish a hot drying atmosphere, the cock of the three-way valve is turned slightly to a third position, which leaves the switch-bar 6 to remain in contact with the electrode 4 and which shuts off the pipe F from the pipe D and opens pipe E, so that no atmosphere is drawn from the tank H. The air is supplied to the tank G and heated therein and passed through the pipes E D to the pump.

The uses for this apparatus are many—such as the treatment of tobacco, cotton, and other organic products, the ventilating of rooms, or the tempering and heating of the atmosphere of greenhouses, hot-beds, &c.

It is obvious that slight changes may be made in this device without departing from the principle, and I therefore do not wish to be limited to the specific features, except as they may be claimed.

Having described my invention, I claim—

1. In an apparatus for supplying atmospheres of various humidities, an air-pump, means for operating the same, an air-humidifying tank containing water, an air-tank, an exit-pipe leading from each tank to the pump, a pipe leading from the air-tank to beneath the water-level of the humidifying-tank, and valve mechanism adapted to open communication directly between the air-tank and the pump, or indirectly through the humidifying-tank, substantially as described.

2. In an apparatus for supplying atmospheres of varying humidity, an air-pump, means for operating the same, an air-tank, an air-supply and air-exit therefor, a heater for said air-tank, an air-humidifying tank under said air-tank and containing water, an exit-pipe in the top of said humidifying-tank, an air-pipe leading from the air-tank to beneath the level of the water in the humidifying-tank constituting the air-supply therefor, radial pipes having air-orifices extending from said air-pipe, a pipe connecting said exhausts with the air-pump, and a valve mechanism adapted to open communication directly between the air-tank and the pump or indirectly through the humidifying-tank whereby cold or heated dry air, and cold or heated moist air may be distributed by said pump, substantially as described.

3. In an apparatus for supplying atmospheres of varying humidity, an air-pump, means for operating the same, an air-humidifying tank containing water, an air-tank, an air-supply and air-exit therefor, a pipe leading from the air-tank to below the water-level of the humidifying-tank, constituting the air-supply therefor, a pipe connecting said exhausts with the air-pump, and a valve mechanism adapted to open communication directly between the air-tank and the pump or indirectly through the humidifying-tank, substantially as described.

4. In an apparatus for supplying atmospheres of varying humidity, an air-pump, means for operating the same, an air-tank, an air-supply and exit therefor, an electric heater in the bottom of said tank, an air-humidifying tank containing water and under the air-tank, an exit-pipe at the top thereof, a vertical pipe extending from the air-tank into the humidifying-tank to beneath the water-level thereof, constituting an air-supply therefor, a subcompartment in the bottom of the humidifying-tank into which said vertical pipe terminates, said vertical pipe having radial pipes within said subcompartment, air-orifices in said radial pipes and subcompartment, a pipe connecting said exits with the air-pump, and a valve mechanism therein adapted to open communication directly between the air-tank and the pump or indirectly through the humidifying-tank, substantially as described.

5. In an apparatus for supplying atmospheres of varying humidity, an air-pump, means for operating the same, an air-tank, air supply and exit therefor, a heater for said tank, an air-humidifying tank, an air-supply pipe therefor leading from the air-tank to beneath the water-level of the humidifying-tank, an exit for said humidifying-tank leading from the top thereof, a pipe connecting said exits with the air-pump, a valve mechanism therein adapted to control said exits, and an electric switch connected to and actuated by said valve automatically, whereby the air-tank heater is operated at predetermined positions of valve adjustment, substantially as described.

In testimony whereof I have hereunto set my hand.

ODIN E. BOGGS.

Witnesses:
OLIVER B. KAISER,
IDA J. LUCAS.